United States Patent [19]

Williams

[11] 3,734,186
[45] May 22, 1973

[54] METHOD FOR ACIDIZING SUBTERRANEAN FORMATIONS

[75] Inventor: Bert B. Williams, Houston, Tex.

[73] Assignee: Esso Production Research Company, Houston, Tex.

[22] Filed: Mar. 25, 1971

[21] Appl. No.: 127,897

[52] U.S. Cl..................................166/282, 166/307
[51] Int. Cl. ...............................................E21b 43/27
[58] Field of Search......................166/271, 281, 282, 166/307; 252/558

[56] References Cited

UNITED STATES PATENTS

| | | | |
|---|---|---|---|
| 3,441,085 | 4/1969 | Gidley | 166/307 |
| 3,353,603 | 11/1967 | Knight | 166/307 |
| 3,374,835 | 3/1968 | Knox | 166/282 |
| 3,306,355 | 2/1967 | Maly | 166/282 X |
| 2,877,186 | 3/1959 | Krumrei | 252/558 X |

*Primary Examiner*—Marvin A. Champion
*Assistant Examiner*—Jack E. Ebel
*Attorney*—James A. Reilly, John B. Davidson, Lewis H. Eatherton, James E. Gilchrist, Robert L. Graham and James E. Reed

[57] ABSTRACT

A method for acidizing a carbonate formation surrounding a well wherein a treating fluid containing an acid which on reaction with the carbonate rock forms a soluble salt and an organic acid which on reaction with the carbonate rock forms an insoluble salt is injected into the formation. An afterflush fluid is then injected into the formation to remove the insoluble salt.

15 Claims, 2 Drawing Figures

INVENTOR.
BERT B. WILLIAMS
ATTORNEY 3,734,186

METHOD FOR ACIDIZING SUBTERRANEAN FORMATIONS

BACKGROUND OF THE INVENTION

1. Field of the Invention

This invention relates to the acid treatment of subterranean formations surrounding oil wells, gas wells, and similar boreholes.

2. Description of the Prior Art

Acids or acid solutions have long been used in the stimulation of oil wells, gas wells, water wells, and similar boreholes. Acid stimulation is generally performed in wells completed in subterranean formations, particularly carbonate formations such as limestone or dolomite. Although acidizing can be used in conjunction with hydraulic fracturing techniques, the present invention finds particular advantageous application in an acidizing technique known as matrix acidizing. This technique is distinguished from acid fracturing by the pressure and rate at which the acid is injected into the formation. In acid fracturing, the acid is injected at a pressure sufficient to rupture the formation creating a fracture which extends a relatively long distance from the borehole. The acid reacting with the carbonate rock etches the fracture walls forming highly conductive channels. Matrix acidizing, on the other hand, requires that the acid be injected at relatively low rates and pressure to prevent fracturing the formation. This type of treatment is generally employed in lieu of acid fracturing in situations where shale or other natural boundaries must be maintained to prevent excessive water or gas encroachment. In matrix acidizing, the permeability of the formation is altered by the acid attacking the carbonate rock to form highly conductive channels which extend outwardly from the wellbore. The channels are generally referred to as wormholes. The degree of stimulation attainable by matrix acidizing is largely dependent upon the extent of the wormhole penetration into the formation. Studies indicate that wormhole penetration is controlled principally by two mechanisms: (1) the rate or acid reaction with the formation rock; and (2) the rate at which the acid leaks off into the formation matrix. Laboratory and field tests have shown that actual wormhole penetration is normally much less than that predicted by theoretical calculations based on acid reaction rate as the controlling mechanism. These tests thus indicate that stimulation afforded by matrix acidizing treatments is not limited by the reaction rate in most applications, but instead is limited by the fluid loss mechanism.

Commercial fluid loss control additives are normally not recommended for use in matrix acidizing fluids. Particulate resins have been used in acids as diverting agents. These resins, however, tend to plug the formation face and prevent the injection of fluids into the formation at matrix injection pressures. Moreover, these materials are difficult to remove from the formation following the treatment. Particles of silica flour and similar inert materials have long been employed as fluid loss control additives in fracturing fluids. These materials, however, are difficult to suspend in low viscosity fluids of the type employed in matrix acidizing. In summary then it is seen that there is a need for an effective fluid loss control material which can be used in matrix acidizing treatments as well as acid fracturing treatments.

SUMMARY OF THE INVENTION

The present invention provides an improved method for acidizing subterranean formations. Although the invention is particularly effective in matrix acidizing treatments, it can be used in other acidizing techniques as well.

In accordance with the invention, it has been found that hydrochloric acid solutions containing small concentrations of certain organic acids react with carbonate rock to form unusually long wormholes. Organic acids usable in the present invention are those which exhibit sufficient solubility or dispersibility in hydrochloric acid solutions or other acids used in matrix acidizing treatments to produce a uniform mixture, and which react with carbonate rock to form a substantially insoluble salt in the acidic or neutralized solution. Suitable organic acids include alkyl aryl sulfonic acids wherein the alkyl group contains from five–18 carbon atoms per molecule, and preferably eight–18 carbon atoms per molecule. The sulfonic acid can be mono or polycyclic and can contain one or more alkyl substituted groups. Dodecylbenzenesulfonic acid has been particularly effective for the purposes of the present invention.

Although the mechanisms responsible for the improved results are not entirely understood, laboratory tests indicate that the precipitated salt has a pronounced effect on the fluid loss property of the acid solution. It is known that long-chain alkyl aryl sulfonic acids—those wherein the alkyl group contains at least five carbon atoms—react with the carbonate rock to form calcium or magnesium salts which are precipitated out of solution. The improved fluid loss property of the solution is believed to be due to this precipitate. Tests indicate that the precipitate behaves much in the same manner as a particulate fluid loss control additive, covering or plugging the pores of the formation and thereby returning fluid leakoff into the formation matrix. Other mechanisms such as the salt precipitate interfering with the chemical reaction between the acid and the carbonate rock may also be present.

It should be observed that the present invention is not limited to the specific materials disclosed in the preferred embodiments. In lieu of hydrochloric acid, aqueous solutions of organic acids such as acetic, formic, chloracetic, or mixtures thereof can be used. The reaction products of these acids at relatively low concentrations with carbonate rock are soluble in the spent acid. In lieu of the alkyl aryl sulfonic acids, other organic acids which satisfy the solubility or dispersibility requirement and which produce a salt precipitate when reacted with carbonate rock can be used. The properties of tall oil acid and long-chain aliphatic carboxylic acids indicate that they too can be used in the method of the present invention.

The prior art teaches that many of the sulfonic acids suggested by the present invention can be used in the treatment of wells. The formulation and concentration of sulfonic acids in accordance with the prior art techniques, however, indicate that they function as surface active agents and not as fluid loss control additives. In contrast to the application of the sulfonic acids as surfactants, the present invention contemplates the use of relatively high concentrations of the sulfonic acids in order to produce sufficient precipitate to significantly alter the fluid loss property of the acid solution. While the concentration of the particular type of acid employed will depend upon several factors, tests have shown that the alkyl aryl sulfonic acids should be used in concentrations ranging between about 1 to about 10 percent by weight of the solution. The concentration of other acids usable in the present invention will depend, in part, upon the solubility of their salt in the spent acid.

In summary, the invention in its broadest form comprises the steps of injecting into a carbonate formation a treating fluid containing an acid capable of reacting with the carbonate rock to produce a soluble salt and an organic acid capable of reacting with the carbonate rock to produce a salt which is substantially insoluble in the acidic or neutralized solution; and thereafter injecting an afterflush fluid into the formation to remove the salt precipitate.

DESCRIPTION OF THE PREFERRED EMBODIMENTS

Figure 1:
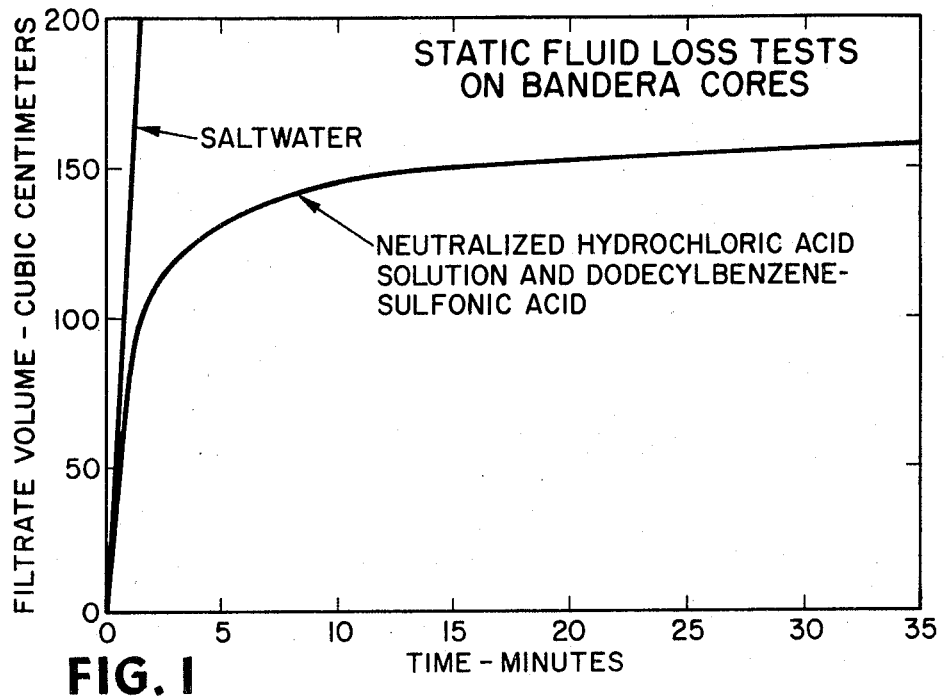
FIGS. 1 and 2 are plots showing the fluid loss characteristic of a 15 percent hydrochloric acid solution neutralized with calcium carbonate and containing 5 percent by weight of dodecylbenzenesulfonic acid.

The acid solution used in the practice of the present invention is a mixture of at least two acids. The principal acid in the solution will be one of the acids commonly used in matrix acidizing treatments. Because hydrochloric acid is the most common acid employed in this type of treatment, the present invention will be described in connection with aqueous hydrochloric acid solution. It should be observed however that other acids commonly used in matrix acidizing can also be used. Hydrochloric acid can be used in solution concentrations between about 1 and about 37 percent by weight but are normally employed in the 15 to 28 percent concentration range.

Field and laboratory tests have shown that when an acid is injected into a carbonate formation at pressures below the fracture pressure, acid flows preferentially into the highest permeability region. This means that the bulk of the acid injected will enter the largest pores. The acid reaction in these pores is characterized by the formation of large channels of wormholes. The number of wormholes formed by the acid treatment will vary depending upon the properties of the acid and the character of the rock treated. Tests have shown that the number of pores enlarged in wormhole formation decreases with time to the point that only a few wormholes continue to grow. The reason for the extension of only a few wormholes is believed to be due to the nature of the chemical reaction. The highly conductive pores or channels receive more of the reactive materials at the expense of the less conductive channels.

As mentioned earlier, the degree of stimulation in matrix acidizing is largely dependent upon the penetration of the wormhole into the formation rock. The use of hydrochloric acid solutions without fluid loss control additives generally is not capable of providing a high degree of stimulation in carbonate formations. The high reactivity of hydrochloric acid with the carbonate rock causes the acid to become neutralized within a relatively short period of time. The acid may thus become spent after only a few inches of penetration into the formation. Wormhole extensions between about four and six inches are the rule for most hydrochloric acid treatments. Matrix acidizing using hydrochloric acids is therefore generally limited to treatments performed to remove formation damage in the immediate vicinity of the wellbore.

Studies have shown that the rate at which the acid leaks off into the formation matrix has a pronounced effect on wormhole penetration. It has been discovered that by admixing a minor amount of a long-chain alkyl aryl sulfonic acid with a solution containing hydrochloric acid or other acid commonly used in matrix acidizing, the fluid loss character of the solution can be altered. Because of the improved fluid loss character, the acid solution produces unusually long wormholes in the carbonate formation. In order to provide the proper balance of water dispersibility and salt insolubility, an alkyl group of the alkyl aryl sulfonic acid should contain between five and 18 carbon atoms, preferably between eight and 18 carbon atoms per molecule. The salts of these acids are substantially insoluble in aqueous solution. Sulfonic acids containing the $C_8 - C_{18}$ alkyl groups are preferred since the sulfonates of these acids are less soluble in aqueous solutions than sulfonates of sulfonic acids containing shorter alkyl groups. Dodecylbenzenesulfonic acid is representative of the type of acids capable of use in the present invention.

The alkyl aryl sulfonic acids are usually prepared by alkylation of an aromatic nucleus followed by the sulfonation of the alkylated aromatic. The alkylation step can be performed by reacting a mixture of alkylchlorides prepared by chlorinating petroleum fractions such as kerosene with an aromatic compound such as benzene in the presence of a condensing agent such as sulfuric acid. These mixtures are then sulfonated which involves the replacement of hydrogen with the sulfo group. The alkyl group generally will consist of a mixture of isomers. The number, position, and length of the alkyl group chain attached to the aromatic nucleus can be varied depending upon the starting materials. Generally however at least one alkyl group will be present and will contain from five to 18 carbon atoms. Depending upon the degree of isomerization, the alkyl group can be present in branched or linear form. Methods for the preparation of these acids suitable for the purposes of the present invention have been described at length in the literature and will be familiar to those skilled in the art.

Aqueous solutions of hydrochloric acid having dissolved or dispersed therein an alkyl aryl sulfonic acid described above generally will be used in carrying out the invention. As mentioned above, the concentration of hydrochloric acid in the aqueous solution can be that presently employed in acidizing treatments. The concentration of the alkyl aryl sulfonic acid will depend in part upon the particular type of acid selected and characteristics of the carbonate formation but will generally be between about 1 and about 10 percent by weight. Aqueous solutions containing less than 1 percent of the sulfonic acid generally produce insufficient sulfonate to significantly affect the fluid loss property of the system. On the other hand, sulfonic acid concentrations in excess of 10 percent are difficult to handle and add appreciably to the cost of the treatment. Moreover, high concentrations could produce excessive precipitate which would impair cleanup operations. In addition to the two types of acids discussed above, the solution can contain additives such as corrosion inhibitors, demulsifiers, surface tension reducing agents, chemical retarding agents, and clay stabilizers, provided of course that these materials are compatible with other materials in the system.

Fluid loss control can be achieved by either dissolving or dispersing the sulfonic acid in the treating fluid. Although alkyl aryl sulfonic acids, particularly those having long-chain alkyl groups, are not readily soluble in mineral acid, their solubility can be increased by the addition of from 1 to 3 percent by weight of a low molecular weight sulfonic acid such p-toluene sulfonic acid. For the purposes of the present invention, however, it is not essential that the alkyl aryl sulfonic acid be dissolved in the treating fluid, but instead can be dispersed therein. At the low concentration contemplated, the sulfonic acid can be readily dispersed in the treating fluid by use of conventional blending equipment and techniques.

As mentioned previously, the acid solution or acid mixture comprises two distinctly different acids, the distinction being the solubility of the reaction products of each in the aqueous solution. The hydrochloric acid reacts to form a soluble salt whereas the alkyl aryl sulfonic acid reacts to form a substantially insoluble salt, e.g., calcium or magnesium alkyl aryl sulfonate. The sulfonate retards fluid leakoff by covering or plugging pores in the matrix wall surrounding the wormhole.

The nature and objects of the invention are further illustrated by the results of tests carried out with hydrochloric acid solutions containing dodecylbenzenesulfonic acids and with conventional hydrochloric acid solutions. The first series of tests, which demonstrate the effectiveness of the proposed acid mixture in providing the unusually long wormholes, were carried out by flooding limestone cores with an aqueous solution of 15 percent HCl containing 3 weight percent of dodecylbenzenesulfonic acid. Similar tests were carried out using a 15 percent hydrochloric acid solution alone. Each of the acid solutions were injected into an 18 inch long core saturated with water at a flow rate of 0.0035 cubic centimeters per second with a system temperature of 200° F. The results are presented in Table I.

TABLE I

RESULTS OF CORE FLOODS

| Acid | Injection Volume (Cubic Centimeters) | Injection Time (Minutes) | Wormhole Length (Inches) |
| --- | --- | --- | --- |
| 15% HCl Solution containing 3% by weight DBSA* | 56 | 267 | 18.0 |
| 15% HCl Solution containing 3% by weight DBSA* | 88 | 418 | 18.0 |
| 15% HCl Solution | 160 | 762 | 3.9 |

*Dodecylbenzenesulfonic Acid

From Table I it can be seen that the 15 percent hydrochloric acid solution alone gave typical wormhole penetration obtained with strong acid. The acid reacted so rapidly that it was essentially spent after a wormhole of only a few inches had been obtained. This behavior is typical of hydrochloric acid and indicates that the effect of acid treatment with hydrochloric acid solution is normally limited to a narrow band in the immediate vicinity of the wellbore. In contrast to the results obtained with straight HCl solutions, the solution containing a mixture HCl and dodecylbenzenesulfonic acid gave far superior results. These tests indicate that a many fold increase in wormhole length over that attainable with hydrochloric acid alone can be obtained with the hydrochloric and dodecylbenzenesulfonic acid mixture. Moreover, the improved results were achieved with less acid injected. The acid mixture penetrated completely through the 18 inch cores with injection volumes of 56 and 88 cubic centimeters, respectively, whereas the solution containing only hydrochloric acid penetrated only about four inches after 160 cubic centimeters had been injected.

Figure 2:
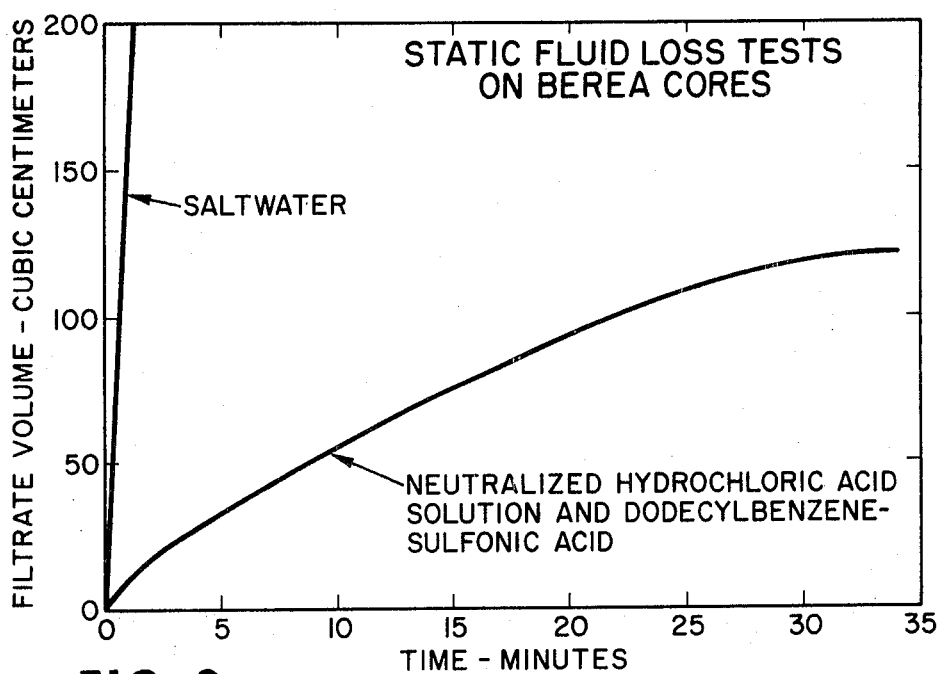

In order to determine the effect of the alkyl aryl sulfonic acid in a spent hydrochloric acid solution, static fluid loss tests were conducted using an aqueous solution containing suspended calcium dodecylbenzenesulfonate. The solution was prepared by neutralizing 15 percent hydrochloric acid with calcium carbonate and adding to the resulting solution sufficient dodecylbenzenesulfonic acid to constitute 5 percent by weight of the total solution. The dodecylbenzenesulfonic acid reacted with the calcium ions to produce insoluble calcium dodecylbenzenesulfonate. The final pH of the fluid was 7.0. Fluid loss tests were run separately on Bandera sandstone cores (2.0 millidarcy permeability) and Berea sandstone cores (70 millidarcy permeability). Each test consisted of placing a cylindrical core two inches in diameter and one-fourth inch long in a suitable container and flowing first saltwater through the core and then the solution prepared as described above. The pressure differential across the Berea cores was maintained at about 9 psi for the saltwater preflush and at about 20 psi for the prepared solution. For the tests using Bandera cores, the pressure differential was maintained at 500 psi. The fluid which passed through the core was collected in a graduated cylinder. The volume of fluid collected in the cylinder was recorded at various time intervals. These data were then used to prepare the plots shown in FIGS. 1 and 2. The curves for the saltwater preflush illustrate the high fluid leakoff rate for low viscosity fluids containing no fluid loss control additive. Hydrochloric acid solutions would be expected to behave in this manner. The curve for the prepared solutions—that is the one containing the precipitated calcium dodecylbenzenesulfonate—illustrate the dramatic effect of precipitated salt on the fluid loss character of the solution. In the tests using Bandera cores, the leakoff rate of the prepared solution, e.g., mixture of spent HCl and dodecylbenzenesulfonic acid, after 5 minutes was about 3 percent that of the saltwater preflush. In tests using Berea cores the leakoff rate of the prepared solution was about 3 percent that of the saltwater throughout the test period. These data demonstrate the pronounced effect that the salt precipitate has on the fluid loss property of the solution.

An important design consideration in the treatment of any subterranean formation is the ability of the treating materials to be removed from the formation following the treatment. If these materials are not removed, they can have a damaging effect on formation permeability. The process of removing such materials is generally referred to in the art as well cleanup. Well cleanup is particularly important when using plugging materials such as fluid loss control additives. An attractive feature of the alkyl aryl sulfonic acids used in accordance with the present invention is that their reaction products can be removed from the formation by a suitable afterflush fluid. The salts of these acids are soluble in a variety of common polar solvents. A series of tests were run to determine the solubility of calcium dodecylbenzenesulfonate. These data are presented in Table II and can be used as a guide in selecting an afterflush fluid capable of removing the salt precipitate from the treated formation.

TABLE II

SOLVENTS FOR CALCIUM DODECYLBENZENESULFONATE

| Solvent | Solubility of Calcium Dodecylbenzenesulfonate |
|---|---|
| Aqueous Solution Saturated with CaCl$_2$ | Insoluble |
| Tap Water | Slightly Soluble |
| Aqueous Solutions of Isopropyl Alcohol: | |
| 10% by Volume of Isopropyl Alcohol | Slightly Soluble |
| 20% by Volume of Isopropyl Alcohol | Soluble |
| Isopropyl Alcohol | Soluble |
| Diesel Oil Containing 50% by Volume of ethylene glycol monobutyl ether | Soluble with Agitation |
| Diesel Oil Containing 75% by Volume of ethylene glycol monobutyl ether | Soluble |
| Ethylene glycol monobutyl ether | Soluble |

The data of Table II indicate that the precipitated salt can be removed by the use of solutions containing dissolved organic polar compounds. In addition to the solvents listed above other polar compounds which may be used include low molecular weight alcohol such as methanol, ethanol, normal butanol, isobutanol, normal hexanol; aldehydes such as propionaldehyde and butyraldehyde; ketones such as acetone; glycols such as ethylene glycol, propylene glycol, and diethylene glycol; and the like. Laboratory tests may be required to determine optimum concentrations of these compounds if used in aqueous or organic solutions. Because of their low costs and ease of preparation, aqueous solutions containing at least 20 percent by volume of isopropanol are preferred as the afterflush solvent. From about one-tenth to about 10 volumes of the afterflush per volume of acid solution is normally used.

In performing a matrix acidizing treatment in accordance with the present invention, it is important to determine the pressure at which the acid can be injected without fracturing the formation. This can be determined by conventional computational techniques employing known or estimated properties of the formation. The pressure limitation determines the rate at which the acid solution can be injected. Normally from 50 to 200 gallons of solution per foot of formation to be treated is injected at rates ranging between about 0.05 and 3.0 barrels per minute. The acid normally will be followed with an afterflush solution of the type described previously.

In carrying out the invention, the acid solution can be pumped into the well, displacing fluids present in the tubing and wellbore into the formation ahead of treating fluids. Alternatively, the well to be treated may first be killed by injecting lease crude oil or brine in quantities sufficient to prevent influx of fluids from the formation. Subsurface pumps and associated equipment, if present, can then be removed from the well. The acid solution can be prepared at the well by the following procedure. A corrosion inhibitor and alkyl aryl sulfonic acid in proper amounts are admixed with a batch of 15 percent hydrochloric acid solution just prior to commencing injection operation. Blending equipment can be utilized to insure uniform dispersion of the additives. The prepared treating fluid is then pumped into the well and injected into the formation at pressure and rates sufficiently low to prevent fracturing the formation. The treating fluid is followed with the afterflush fluid which can be displaced from the wellbore and injected into the formation using lease crude oil or brine. The well is then shut in and allowed to stand for a period ranging from a few minutes to several days. The shut in period permits the afterflush to dissolve the salt precipitate. Following the shut in period, the well is placed on production.

The following is one specific procedure employed to treat a 10 foot interval of a thick carbonate formation producing from about 10,000 feet. The acid solution is prepared by mixing 25 gallons of a corrosion inhibitor and 55 gallons of dodecylbenzenesulfonic acid with 1,000 gallons of a 15 percent hydrochloric acid solution. The acid solution is injected into the formation at a rate of eight barrels per minute and at a surface pressure not exceeding 2,500 psi. The acid solution is followed with 1,000 gallons of an aqueous afterflush solution containing 50 percent by volume of isopropyl alcohol. The afterflush solution is displaced from the wellbore and forced into the formation using field brine. After a shut in period of from about 1 to about 6 hours, the well is placed on production.

I claim:

1. A method for acidizing a subterranean carbonate formation surrounding a wellbore which comprises injecting into said formation an aqueous fluid containing a first acid which reacts with carbonate rock to form a soluble salt in said aqueous fluid and between about 1 and about 10 percent by weight of an alkyl aryl sulfonic acid which reacts with carbonate rock to form an acid insoluble salt precipitate, an alkyl group of said alkyl aryl sulfonic acid containing at least five carbon atoms.

2. A method as defined in claim 1 wherein said aqueous fluid is injected at pressures below the fracturing pressure of said formation.

3. A method as defined in claim 1 wherein the weight concentration of said first acid in said aqueous fluid is greater than the weight concentration of said alkyl aryl sulfonic acid in said aqueous fluid.

4. A method as defined in claim 1 wherein said alkyl aryl sulfonic acid is alkylbenzenesulfonic acid wherein the alkyl group contains from eight to 18 carbon atoms.

5. A method as defined in claim 4 wherein the alkylbenzenesulfonic acid is dodecylbenzenesulfonic acid.

6. A method as defined in claim 1 and further comprising injecting an afterflush fluid into said formation for removing portions of said precipitate from said formation, said afterflush fluid including an organic polar compound.

7. A method as defined in claim 6 wherein the organic polar compound is an alcohol.

8. A method as defined in claim 1 wherein said first acid is hydrochloric acid.

9. A method as defined in claim 8 wherein the concentration of said hydrochloric acid in said aqueous fluid is greater than the concentration of said alkyl aryl sulfonic acid in said aqueous fluid.

10. A method for acidizing a subterranean carbonate formation surrounding a wellbore which comprises injecting into said formation a hydrochloric acid solution containing from about 1 to about 10 percent by weight of an alkyl aryl sulfonic acid which reacts with the carbonate formation to form an acid insoluble precipitate, an alkyl group of said alkyl aryl sulfonic acid containing at least five carbon atoms; and thereafter injecting an afterflush fluid into said formation for removing portions of said precipitate from said formation.

11. A method as defined in claim 10 wherein the alkyl group of the alkyl aryl sulfonic acid contains between 8 and 18 carbon atoms per molecule.

12. A method as defined in claim 10 wherein the alkyl aryl sulfonic acid is dodecylbenzenesulfonic acid.

13. A method as defined in claim 10 wherein said afterflush fluid is capable of dissolving the reaction products of said alkyl aryl sulfonic acid and carbonate formation.

14. A method as defined in claim 10 wherein the hydrochloric acid solution further contains an effective amount of a low molecular weight sulfonic acid capable of improving the solubility of said alkyl aryl sulfonic acid.

15. A method as defined in claim 14 wherein said low molecular weight sulfonic acid is p-toluene sulfonic acid.

* * * * *